United States Patent
Li (10) Patent No.: US 11,700,088 B2
(45) Date of Patent: Jul. 11, 2023

(54) DATA TRANSMISSION METHOD AND APPARATUS, AND STORAGE MEDIUM

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 117 days.

(21) Appl. No.: 17/432,757

(22) PCT Filed: Feb. 22, 2019

(86) PCT No.: PCT/CN2019/075910
§ 371 (c)(1),
(2) Date: Aug. 20, 2021

(87) PCT Pub. No.: WO2020/168557
PCT Pub. Date: Aug. 27, 2020

(65) Prior Publication Data
US 2022/0150002 A1    May 12, 2022

(51) Int. Cl.
*H04L 5/00* (2006.01)
*H04W 72/044* (2023.01)

(52) U.S. Cl.
CPC .......... *H04L 5/0007* (2013.01); *H04L 5/0082* (2013.01); *H04W 72/044* (2013.01)

(58) Field of Classification Search
CPC .......................... H04L 5/0053; H04W 72/0446
See application file for complete search history.

(56) References Cited

U.S. PATENT DOCUMENTS

| 2019/0191457 A1* | 6/2019 | Si | H04L 5/005 |
| 2020/0351758 A1* | 11/2020 | Bhattad | H04W 16/14 |
| 2022/0385502 A1* | 12/2022 | Elshafie | H04L 5/0094 |

OTHER PUBLICATIONS

PCT/CN2019/075910 English translation of the International Search Report dated Nov. 15, 2019, 2 pages.
Ericsson: "Enhancements to Uplink and Downlink Physical Channels for NR URLLC", 3GPP TSG-RAN WG1 Meeting #94BIS R1-1810174, Sep. 29, 2018.
Ericsson: "PUSCH Enhancements for NR URLLC", 3GPP TSG RAN WG1 Ad-Hoc Meeting 1901 R1-1900160, Jan. 12, 2019.
Ericsson: "PUSCH Enhancements for NR URLLC", 3GPP TSG RAN WG1 Meeting #96 R1-1901595, Feb. 16, 2019.

* cited by examiner

*Primary Examiner* — Kevin Kim
(74) *Attorney, Agent, or Firm* — Cozen O'Connor (57) ABSTRACT

A method and a device for data transmission, and a storage medium are provided. The method includes: acquiring resource location indication information of at least one transmission; and when performing an ith transmission in at least one transmission, in response to an available transmission duration in the current time slot is less than a transmission duration of the ith transmission, performing the ith transmission with a second device within the current time slot and at least one time slot after the current time slot.

17 Claims, 7 Drawing Sheets acquiring resource location indication information of the at least one embodiment — 301 when performing an ith transmission of the at least one transmission, in response to an available transmission duration in a current time slot being less than the transmission duration of the ith transmission, performing the ith transmission with a second device within the current time slot and at least one time slot after the current time slot — 302

DATA TRANSMISSION METHOD AND APPARATUS, AND STORAGE MEDIUM

CROSS-REFERENCE TO RELATED APPLICATION

This application is a U.S. national phase of International Application No. PCT/CN2019/075910, filed with the State Intellectual Property Office of P. R. China on Feb. 22, 2019.

TECHNICAL FIELD

The present disclosure relates to a field of wireless communication technology, and more particularly to a method and a device for data transmission, and a storage medium.

BACKGROUND

The diversification of user's communication requirements and the emergence of new mobile services are driving the evolution of wireless communications networks to the fifth generation mobile communication (5G) network. An ultra reliable low latency communication (URLLC) is one of three communication scenarios of the 5G network.

Communication services based on the URLLC type include internet of vehicles (IOV), industrial control, public security service, etc. In order to ensure safe operation of the services, mobile networks on the uplink and downlink user plane are specified to provide a millisecond time delay requirement, and it is required that a time delay of end to end (E2E) data transmission is lower than 0.5 ms.

SUMMARY

The disclosure provides a method and a device for data transmission, and a storage medium. The technical solution will be described as follows.

According to a first aspect of embodiments of the disclosure, a method for data transmission is provided. The method is performed by a first device of two devices for data transmission, and includes: acquiring resource location indication information of at least one transmission, the resource location indication information being configured to indicate a starting transmission location and a transmission duration of each of the at least one transmission; when performing an ith transmission of the at least one transmission, performing the ith transmission with a second device within a current time slot and at least one time slot after the current time slot in response to an available transmission duration in the current time slot being less than the transmission duration of the ith transmission, the second device being the other device of the two devices; in which, the available transmission duration is a duration for data transmission after the starting transmission location of the ith transmission in the current time slot.

According to a second aspect of embodiments of the disclosure, a device for data transmission is provided. The device is applicable in a first device of two devices for data transmission, and includes: a processor; a memory configured to store instructions executable by the processor; in which, the processor is configured to: acquire resource location indication information of at least one transmission, the resource location indication information being configured to indicate a starting transmission location and a transmission duration of each of the at least one transmission; when performing an ith transmission of the at least one transmission, perform the ith transmission with a second device within a current time slot and at least one time slot after the current time slot in response to an available transmission duration in the current time slot being less than the transmission duration of the ith transmission, the second device being the other device of the two devices; in which, the available transmission duration is a duration for data transmission after the starting transmission location of the ith transmission in the current time slot.

According to a third aspect of embodiments of the disclosure, a computer readable storage medium is provided, in which the computer readable storage medium includes executable instructions. The executable instructions are called by a processor of a first device to implement the method for data transmission as described in the first aspect or any possible scheme of the first aspect.

It should be noted that, the details above and in the following are exemplary, and do not constitute a limitation of the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

It should be understood that, in the disclosure, "several" means one or more, and "a plurality of" means two or more. "and/or", describes the relationship of the association objects, indicating that there may exist three relationships, for example, A and/or B, may represent: any of existing A only, existing both A and B, or existing B only. The character "/" generally means the contextual object is a kind of "or" relationship.

Three application scenarios of 5G are defined by an international telecommunication union (ITU), including: enhanced Mobile Broad Band (eMBB), massive Machine Type Communication (mMTC) and URLLC. Service types in different application scenarios have different requirements for the wireless communication technology, for example, a major requirement of the eMBB service type focuses on a large bandwidth, a high rate, etc.; a major requirement of the mMTC service type focuses on a connection rate of a machine; and a major requirement of the URLLC service type focuses on a relatively high reliability and a relatively low time delay.

Figure 1:
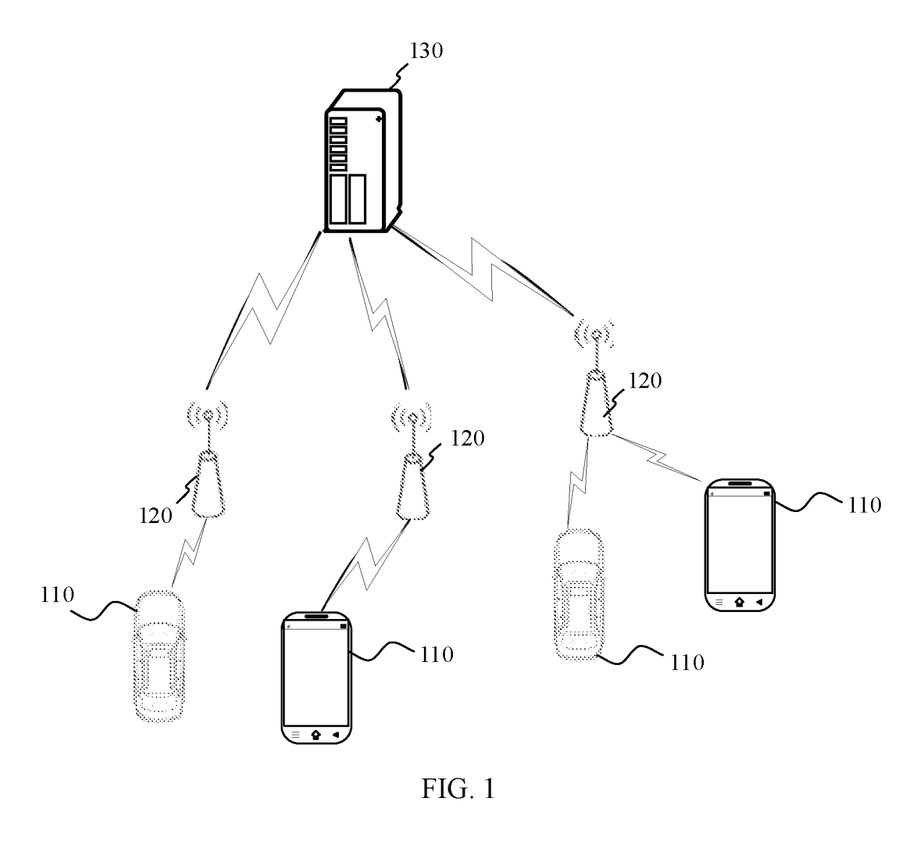
FIG. 1 is a schematic diagram illustrating a wireless communication system according to an embodiment of the present disclosure.

FIG. 1 is a schematic diagram illustrating a wireless communications system according to an embodiment of the present disclosure. As illustrated in FIG. 1, a wireless communication system is a communication system based on a cellular mobile communication technology. The wireless communication system may include several terminals 110 and several base stations 120.

The terminal 110 may refer to a device that provides voice and/or data connectivity for a user. The terminal 110 may communicate with one or more core networks through a radio access network (RAN). The terminal 110 may be an internet of things terminal, for example, a sensor device, a mobile phone (or referred to as a cellular phone) and a computer having an internet of things terminal, for example, may be a fixed, portable, compact, handheld, computer built-in or vehicle-mounted apparatus, for example, a station (STA), a subscriber unit, a subscriber station, a mobile station, a mobile, a remote station, an access point, a remote terminal, an access terminal, a user terminal, a user agent, a user device or a user equipment (UE). Or, the terminal 110 may be a device of an unmanned vehicle, a vehicle-mounted device, etc.

The base station 120 may be a network side device in the wireless communication system. The wireless communication system may be the 4th generation mobile communication (4G) system, also referred to as a long term evolution (LTE) system; or the wireless communication system may be the 5G system, also referred to as a new radio (NR) system. Or, the wireless communication system may be a next generation system of the 5G system.

The base station 120 may be an eNB adopted in the 4G system. Or, the base station 120 may be a base station (gNB) with a centralized distributed architecture in the 5G system. When the base station 120 adopts a centralized distributed architecture, it generally includes a central unit (CU) and at least two distributed units (DU). The central unit is provided with a protocol stack including a Packet Data Convergence Protocol (PDCP) layer, a Radio Link Control (RLC) layer and a Media Access Control (MAC) layer. The distributed unit is provided with a protocol stack including a physical (PHY) layer. The specific implementation of the base station 120 is not limited in embodiments of the disclosure.

A wireless connection can be established between the base station 120 and the terminal 110 through a wireless radio. In different implementations, the wireless radio is a wireless radio based on a 4G standard; or, the wireless radio is a wireless radio based on a 5G standard, for example, the wireless radio is a new radio; or, the wireless radio may be a wireless radio based on a next generation mobile communication network technology standard of the 5G.

Alternatively, the wireless communication system may further include a network management device 130.

The several base stations 120 may be connected with the network management device 130. The network management device 130 may be a core network device in the wireless communication system, for example, the network management device 130 may be a mobility management entity (MME) in an evolved packet core (EPC) network. Or, the network management device may be a device in other core networks, for example, a Serving GateWay (SGW), a Public Data Network GateWay (PGW), a Policy and Charging Rules Function (PCRF) or a Home Subscriber Server (HSS), etc. The implementation of the network management device 130 is not limited in the embodiment of the disclosure.

In a possible implementation, in the wireless communications system, one or more burst transmissions may occur during a data transmission between a sending device and a receiving device.

The sending device and the receiving device may be a base station and a terminal; for example, the sending device may be a base station, and the receiving device may be a terminal; or, the sending device may be a terminal, and the receiving device may be a base station. Or, the sending device and the receiving device may be both terminals; that is, the sending device is a terminal, and the receiving device may be another terminal.

Figure 2:
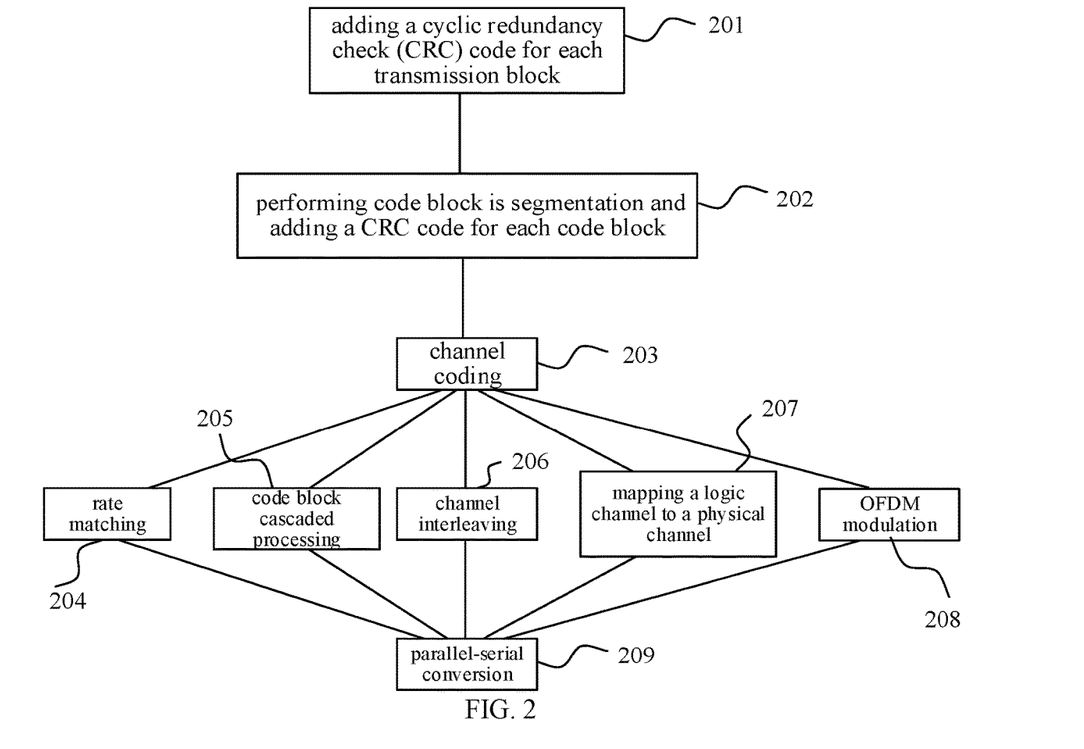
FIG. 2 is a flowchart illustrating a process flow of a burst transmission at a physical layer according to an embodiment of the present disclosure.

Taking a terminal having burst data to be transmitted to a base station as an example (that is, the sending device is a terminal and the receiving device is a base station), FIG. 2 is a flowchart illustrating a process flow of a burst transmission at a physical layer according to an embodiment of the present disclosure. As illustrated in FIG. 2, the process flow of a burst transmission at the physical layer by a transmitting end of the terminal may include the following.

At block 201, a cyclic redundancy check (CRC) code is added for each transmission block.

The sending end adds the CRC check code for a data block transmitted from a MAC layer in order to ensure error detection of a channel. The sending end may be a terminal or a base station in the wireless communications system, that is, when the terminal sends data, the terminal is the sending end, and when the base station sends data, the base station is the sending end.

At block 202, code block segmentation is performed and the CRC code is added for each code block.

The sending end needs to perform code block segmentation on the transmission block in order to ensure that each code block has no more than X bits. X may be obtained by the sending end through calculation. Alternatively, the sending end may determine a Modulation and Coding Scheme (MC S) level according to an available time frequency resource in the time slot, and calculates the value of X according to the MCS level. In order to ensure that the receiving end may suspend erroneous encoding in advance, the CRC code is further added to each code block.

At block 203, channel coding is performed.

At block 204, rate matching is performed.

At block 205, code block cascaded processing is performed.

At block 206, channel interleaving is performed.

At block 207, a logic channel is mapped to a physical channel.

At block 208, OFDM modulation is performed.

Alternatively, the sending end may further add a cyclic prefix (CP) during the OFDM modulation. Blocks 204 to 208 may be executed in parallel at the sending end, that is, the sending end may execute blocks 205 to 208 at the same time as when executing block 204.

At block 209, a parallel-serial conversion is performed.

In a 5G communication scenario, a new radio waveform of 5G is a numerology based on a flexible and extensible orthogonal frequency division multiplexing (OFDM), which includes a subcarrier interval, a cyclic prefix, a symbol length, etc. In the new radio waveform, a time slot length and the number of included symbols may be flexibly configured according to the subcarrier interval. Alternatively, one sub frame may be divided into a plurality of time slots, for example, 2 or 4 time slots, and each slot may include a plurality of OFDM symbols, for example, 7 or 14 OFDM symbols. In addition, 5G introduces a concept of mini-slots, and a time slot may be split into several mini-slots for rapid scheduling and transmission of data.

Data needs to be transmitted according to the above time slot structure, for example, data is transmitted within the second to third symbol of a time slot. In the current protocol version, during resource scheduling of a Physical Downlink Shared Channel (PDSCH) or a Physical Uplink Shared Channel (PUSCH), the sending end may calculate a starting symbol location S and a length L of a continuous time domain resource for data transmission according to the start and length indicator value (SLIV) when sending data. Alternatively, the sending end may have a parameter table of rational values of S and L. As illustrated in Table 1, rational values of S and L are included.

TABLE 1

| PDSCH mapping type | general cyclic prefix | | | extended cyclic prefix | | |
|---|---|---|---|---|---|---|
| | S | L | S + L | S | L | S + L |
| Type A | {1, 2, 3, 4} | {3, 4 . . . , 13, 14} | {3, 4 . . . , 13, 14} | {1, 2, 3, 4} | {3, 4 . . . , 11, 12} | {3, 4 . . . , 11, 12} |
| Type B | {0, 2 . . . , 11, 12} | {2, 4, 7} | {2, 3 . . . , 13, 14} | {0, 1 . . . , 9, 10} | {2, 4, 6} | {2, 3 . . . , 13, 14} |

Alternatively, the method of calculating values of S and L by the sending end may be as follows: when $(L-1) \leq 7$, $SLIV=14*(L-1)+S$, or else, $SLIV=14*(14-L-1)\pm(14-1-S)$, where $0<L \leq 14-S$. The sending end may calculate values of S and L according to an internal algorithm. For example, when SLIV=58, the sending end may calculate the values of S and L according to the above calculation method, which may be S=2, L=5. In combination with Table 1, it may be determined that the PDSCH mapping type is Type A. The sending end may send data in the form of the PDSCH mapping type being Type A within continuous 5 symbols starting from symbol 2 of the current time slot. Alternatively, the Table 1 may be configured in the sending end by a developer or an operator.

In the related art, the sending end deems that the combination of S and L defined in the Table 1 is effective when transmitting data in the current time slot. In a possible implementation, when the value of L calculated by the sending end according to the SLIV is 7, that is, 7 symbols are required when transmitting data, and if the number of symbols for data transmission in the current time slot is less than 7, the sending end may only wait for a time slot with the number of symbols for data transmission meeting a requirement of 7 symbols and transmit the data in the corresponding time slot. In the communication requirement of the current communication service, existence of the waiting leads to relatively large time delay of data transmission and low efficiency of data transmission.

Figure 3:
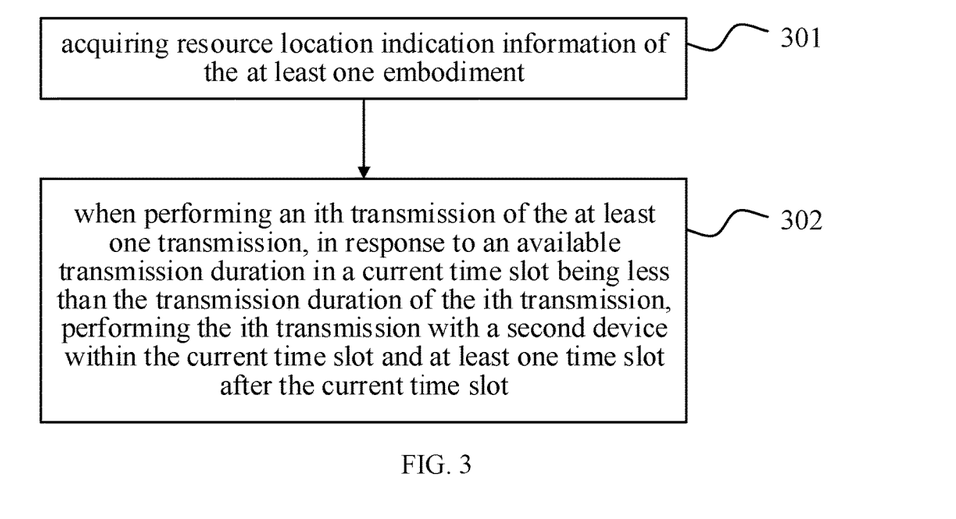
FIG. 3 is a flowchart illustrating a method for data transmission according to an embodiment of the present disclosure.

In order to solve the problem of a larger time delay caused by the transmission needing to be started in the next time slot when the number of symbols for transmission in the current time slot is less than the number of symbols required by the transmission, the embodiments of the disclosure provide a method for data transmission. The method may be executed by a first device, the first device is one device of two devices for data transmission (that is, a sending device and a receiving device). FIG. 3 is a flowchart illustrating a method for data transmission according to an embodiment of the present disclosure. As illustrated in FIG. 3, the method for data transmission may include the following.

At block 301, resource location indication information of at least one transmission is acquired.

The resource location indication information is configured to indicate a starting transmission location and a transmission duration of each of the at least one transmission.

At block 302, when performing an ith transmission of the at least one transmission, in response to an available transmission duration in the current time slot being less than the transmission duration of the ith transmission, the ith transmission is performed with a second device within the current time slot and at least one time slot after the current time slot.

The second device is the other device of the two devices for data transmission.

The available transmission duration is a duration for data transmission after the starting transmission location of the ith transmission in the current time slot.

When the first device configured to execute the above blocks is the sending device, the ith transmission performed between the first device and the second device may refer to that the sending device sends data corresponding to the ith transmission to the receiving device.

Correspondingly, when the first device configured to execute the above blocks is the receiving device, the ith transmission performed between the first device and the second device may refer to that the receiving device receives data corresponding to the ith transmission sent by the sending device.

Alternatively, for the first transmission of the at least one transmission, the resource location indication information includes first location information corresponding to the first transmission, and the first location information is configured to indicate a starting transmission location and a transmission duration of the current transmission.

Alternatively, the first location information of the first transmission includes a starting symbol location of the first transmission and the number of OFDM symbols used for the first transmission. The starting symbol location is a location of the first OFDM symbol of the current transmission in the corresponding time slot.

Alternatively, the first location information of the first transmission includes an SLIV of the first transmission.

Alternatively, when the SLIV of the first transmission is a preset value, the first location information of the first transmission further includes start location indication information, and the start location indication information is configured to indicate whether the corresponding starting symbol location is greater than a preset symbol location.

Alternatively, for the ith transmission, when i is greater than or equal to 2, the transmission duration of the ith transmission is different from the transmission duration of the first transmission of the at least one transmission, and a resource of the ith transmission is not adjacent to a resource of the (i−1)th transmission of the at least one transmission, the resource location indication information includes first location information corresponding to the ith transmission, and the first location information is configured to indicate a starting transmission location and a transmission duration of the current transmission.

Alternatively, for the ith transmission, when i is greater than or equal to 2, the transmission duration of the ith transmission is different from the transmission duration of the first transmission of the at least one transmission, and a resource of the ith transmission is adjacent to a resource of the (i−1)th transmission of the at least one transmission, the resource location indication information includes second location information corresponding to the ith transmission, the second location information includes the number of OFDM symbols used for the current transmission.

Alternatively, for the ith transmission, when i is greater than or equal to 2, the transmission duration of the ith transmission is the same as the transmission duration of the first transmission of the at least one transmission, and a resource of the ith transmission is not adjacent to a resource of the (i−1)th transmission of the at least one transmission, the resource location indication information includes third location information corresponding to the ith transmission, the third location information includes the starting symbol location of the current transmission.

Alternatively, for the ith transmission, when i is greater than or equal to 2, the transmission duration of the ith transmission is the same as the transmission duration of the first transmission of the at least one transmission, and a resource of the ith transmission is adjacent to a resource of the (i−1)th transmission of the at least one transmission, the resource location indication information includes fourth location information corresponding to the ith transmission, the fourth location information is empty.

In summary, according to the disclosure, data transmission is performed with the second device within the available transmission duration in the current time slot of the ith transmission and at least one time slot after the current time slot. A transmission delay problem caused by performing transmission within the next time slot when the available transmission duration in the current time slot is less than the transmission duration of the ith transmission may be avoided, a waiting delay of date transmission is reduced and data transmission efficiency is improved.

Figure 4:
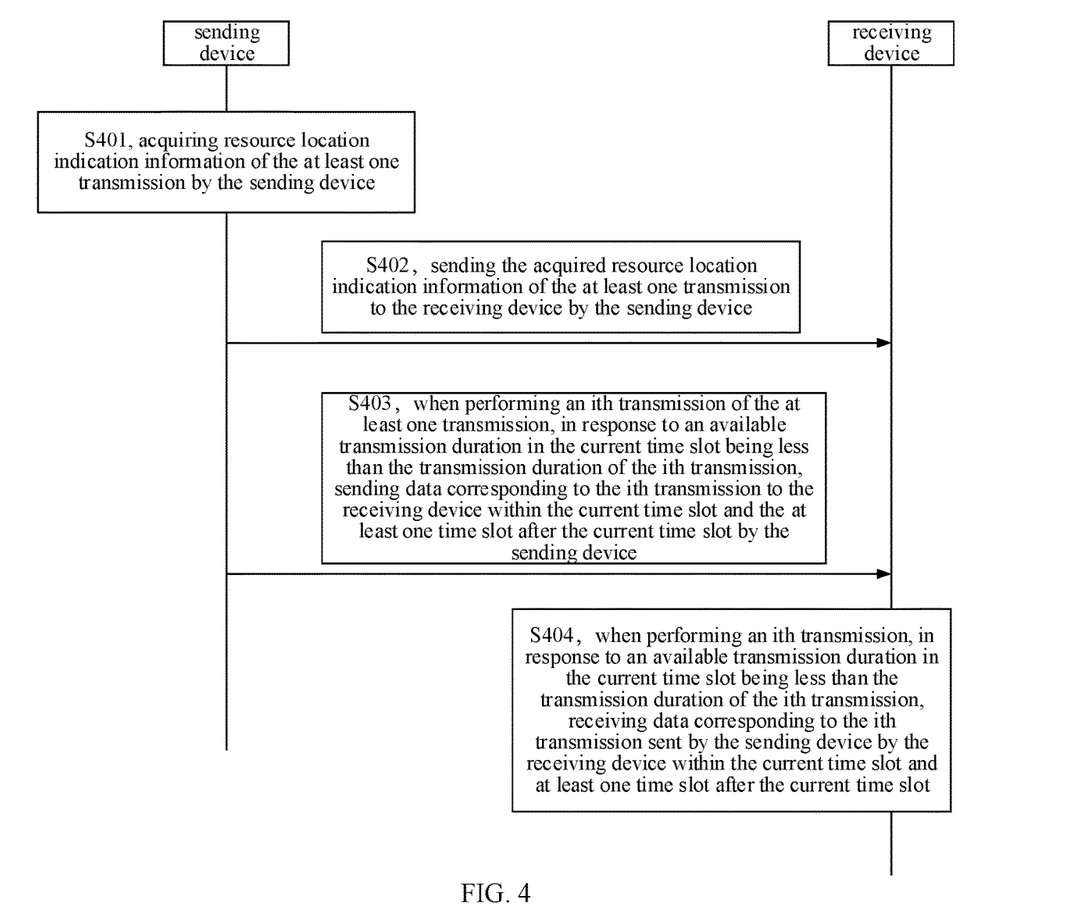
FIG. 4 is a flowchart illustrating a method for data transmission according to an embodiment of the present disclosure.

In a possible implementation, in the wireless communications system as illustrated in FIG. 1, and take the sending device being a base station and the receiving device being a terminal for an example. In the burst scheduling between the base station and the terminal, the base station initiatively sends burst data to the terminal. In the process of receiving the burst data sent by the base station by the terminal, the embodiments of the present disclosure provide a method for data transmission. FIG. 4 illustrates a flowchart of a method for data transmission provided in embodiments of the disclosure. As illustrated in FIG. 4, the method for data transmission may include the following.

At block 401, the sending device acquires resource location indication information of at least one transmission.

The resource location indication information is configured to indicate a starting transmission location and a transmission duration of each of the at least one transmission.

In embodiments of the disclosure, the at least one transmission may be a single transmission of one transmission block, or, the at least one transmission may be a first transmission of one transmission block and at least one retransmission after the first transmission.

In a possible implementation, when the receiving device receives data sent by the sending device, the sending device needs to transmit the same data multiple times to the receiving device due to interference between data and a receiving signal of the receiving end, so that the receiving device may acquire correct and complete data.

For example, taking the sending device being the base station and the receiving device being the terminal for an example, retransmission technologies adopted by the sending device and the receiving device may be a Hybrid Automatic Repeat Request (HARQ) at the MAC layer, and an Automatic Repeat Request (ARQ) at the Radio Link Control (RLC) layer. The HARQ adopts a stop-and-wait protocol to send data. In the stop-and-wait protocol, the sending device stops to wait for confirmation information after sending a transmission block. The receiving device may feedback acknowledge or non-acknowledge of the transmission block with 1 bit information.

Figure 5:
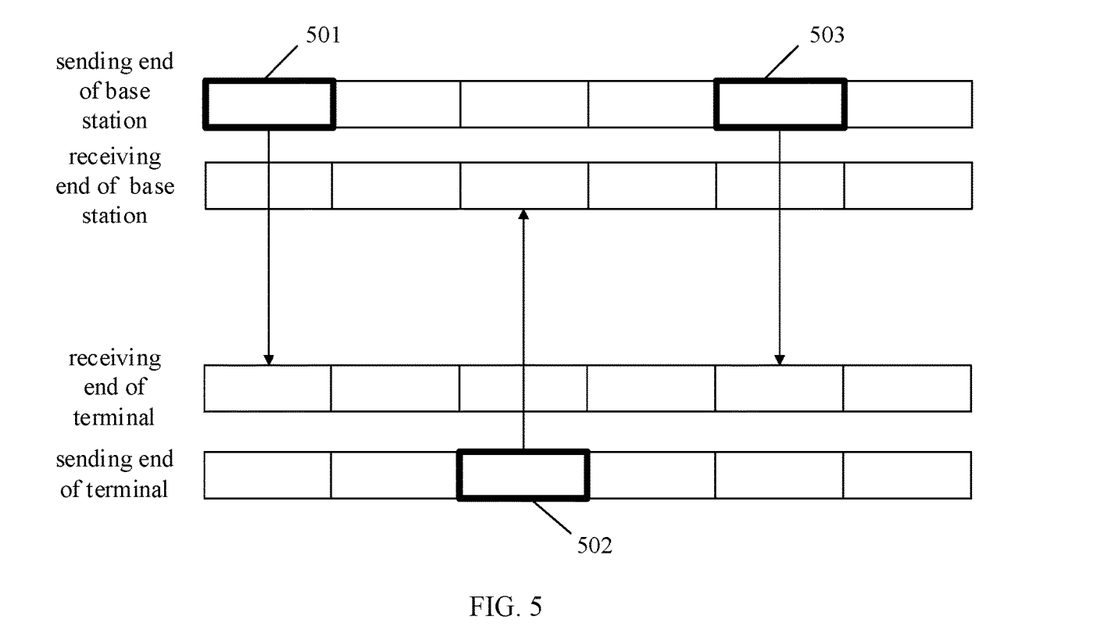
FIG. 5 is a schematic diagram illustrating a data transmission between a base station and a terminal based on the HARQ retransmission according to an embodiment of the present disclosure.

FIG. 5 is a schematic diagram illustrating a data transmission between a base station and a terminal based on the HARQ retransmission according to an embodiment of the present disclosure. As illustrated in FIG. 5, it includes a first time frequency resource 501, a second time frequency resource 502 and a third time frequency resource 503. The base station sends a first transmission block for the first time within the first time frequency resource 501 and may wait for confirmation information through a certain time resource after completing the first transmission. When the confirmation information received within the second time frequency resource 502 is non-acknowledge information of the first transmission block from the terminal, the base station may resend the first transmission block within the third time frequency resource 503, and may wait for confirmation information of the transmission block sent in this transmission from the receiving end after completing the sending. When the confirmation information received by the base station at this time is still non-acknowledge information, the terminal may repeat transmission of data on the subsequent time frequency resource till the receiving end receives exact data.

Or, in another possible implementation, the sending device may not necessarily wait for a response fed back by the receiving device and may directly perform repeat transmission of one data block for many times according to a preconfigured retransmission strategy. For example, the same data block is transmitted multiple times on the plurality of continuous and discontinuous time frequency resources according to the predetermined retransmission times.

Alternatively, taking the sending device being a base station and the receiving device being a terminal for an example, in the 5G new radio system, the base station sends the terminal DCI to inform the terminal of the time frequency resource on which data is sent, and the terminal receives or sends the corresponding data according to the time frequency resource indicated by the DCI after receiving the corresponding DCI. That is, before sending data, the base station may inform the terminal of the time frequency resources on which data is sent in advance through the DCI, and the terminal receives data in the corresponding time frequency resource according to the received DCI. Alternatively, the DCI may be sent via system information broadcast by the base station, for example, the system information may be sent in a hierarchical manner, that is, the sending end first sends a physical broadcast channel (PBCH), the PBCH including a master information block (MIB), and a system information block (SIB) 1, remaining minimum system information (RMSI), other SIBs as well as open system interconnection (OSI) information are included in the subsequent hierarchical sending. The PBCH includes necessary information for the RMSI, RMSI and OSI include access information and other necessary system information.

In a possible implementation, during normal data transmission between the base station and the terminal, the base station may need to transmit burst data to the terminal, in this case, the base station may determine a size of a transmission block according to the amount of data needed to be sent and a communication time delay between the base station and the terminal, and determine a MCS level of at least one transmission of the transmission block and resource location indication information of the at least one transmission based on the current available time frequency resource. Alternatively, the generation of the burst data includes but is not limited to sending by the terminal a service requirement of URLLC to the base station.

Figure 6:
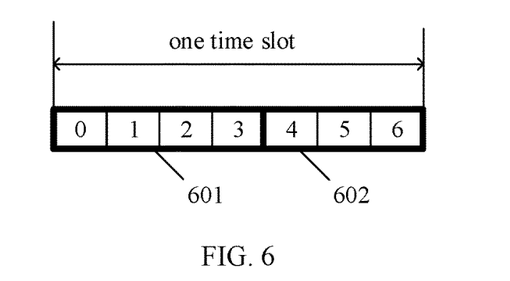
FIG. 6 is a schematic diagram illustrating allocation of a time slot according to an embodiment of the present disclosure.

FIG. 6 is a schematic diagram illustrating allocation of a time slot structure according to an embodiment of the present disclosure. As illustrated in FIG. 6, taking 7 OFDM symbols in one time slot for an example, a first symbol area 601 and a second symbol area 602 are included in the time slot. Data has been occupied and transmitted in the first symbol area 601, and no data is transmitted in the second symbol area 602, that is, the second symbol area 602 is a transmittable area in the current time slot, the duration consisting of the symbol length of the second symbol area 602 can be considered as a transmittable duration in the current time slot.

Alternatively, for the first transmission in the at least one transmission, the resource location indication information includes first location information corresponding to the first transmission, and the first location indication information is configured to indicate a starting transmission location and a transmission duration of the current transmission.

Alternatively, the starting transmission location and the transmission duration may be a starting symbol location of the transmission and the number of OFDM symbols used for the transmission.

In a possible implementation, the first location information of the first transmission may include a starting symbol location of the first transmission and the number of OFDM symbols used for the first transmission. The starting symbol location is a location of the first OFDM symbol of the current transmission in the corresponding time slot.

For example, the starting symbol location may be a value of S, and the number of OFDM symbols may be a value of L. When the starting symbol location of the first transmission is the fifth symbol, and the transmission duration is 3 symbol lengths, the first location information of the first transmission may directly carry the value "5" of S and the value "3" of L.

In another possible implementation, the first location information of the first transmission includes an SLIV of the first transmission.

In embodiments of the disclosure, on the basis of an SLIV mechanism in Table 1, the size limitation on S and L may be removed, that is, the limitation of $0<L\leq 14-S$ is removed. The mechanism indicating that when $(L-1)\leq 7$, $SLIV=14*(L-1)+S$, or else, $SLIV=14*(14-L-1)\pm(14-1-S)$ is retained.

In a possible implementation, when the SLIV of the first transmission is a preset value, the first location information of the first transmission further includes start location indication information. The start location indication information is configured to indicate whether the corresponding starting symbol location S is greater than a preset symbol location. Alternatively, the base station stores a preset table containing preset values for SLIV.

Due to deletion of the limitation of $0<L\leq 14-S$ in the disclosure, certain SLIVs may lead to two different sums of the values of S and L, and when the above preset value refers to the SLIV mechanism as illustrated in Table 1, values of two solution combination methods may be derived. For example, according to the mechanism indicating that when $(L-1)\leq 7$, $SLIV=14*(L-1)+S$, or else, $SLIV=14*(14-L-1)\pm(14-1-S)$, there are SLIVs of two solution combination methods. The corresponding solution combination methods and allocation types (mapping type) are illustrated in Table 2.

TABLE 2

| S | L | SLIV | allocation type |
|---|---|------|-----------------|
| 12 | 7 | 96 | Type B |
| 1 | 9 | 96 | Type A |
| 12 | 4 | 54 | Type B |
| 1 | 12 | 54 | Type A |
| 11 | 7 | 95 | Type B |
| 2 | 9 | 95 | Type A |
| 11 | 4 | 53 | Type B |
| 2 | 12 | 53 | Type A |
| 1 | 14 | 26 | Type A |
| 12 | 2 | 26 | Type A |
| 2 | 13 | 39 | Type A |
| 11 | 3 | 39 | Type A |
| 3 | 12 | 52 | Type A |
| 10 | 4 | 52 | Type A |
| 3 | 13 | 38 | Type A |
| 10 | 3 | 38 | Type A |
| 3 | 14 | 24 | Type A |
| 10 | 2 | 24 | Type A |

As illustrated in Table 2, when the base station obtains an SLIV of the first transmission and knows through querying Table 1 or Table 2 that the SLIV of the first transmission belongs to the SLIV data in Table 2, the first location information of the first transmission further includes start location indication information, that is, when transmitting the first location information of the first transmission, the base station may separately add an additional bit (i.e. start location indication information) for differentiating whether the value of the starting symbol location S is greater than 7 in the control signaling. For example, 0 means that the value of S is less than or equal to 7, and 1 means that the value of S is greater than 7. Based on the start location indication information, a corresponding solution combination method of the values of S and L and the corresponding mapping type may be determined from Table 2.

In a possible implementation, for the ith transmission, when i is greater than or equal to 2, the transmission duration of the ith transmission is different from the transmission duration of the first transmission of the at least one transmission, and the resource of the ith transmission is adjacent to the resource of the (i−1)th transmission of the at least one transmission, the resource location indication information includes second location information corresponding to the ith transmission and the second location information includes the number of OFDM symbols used for the current transmission.

That is, during the ith transmission after the first transmission, when the time domain resource of the ith transmission is immediately after the last transmission, but the number of OFDM symbols used is different from the number of OFDM symbols used for the first transmission, it is unnecessary to indicate the starting symbol location of the ith transmission but only necessary to indicate the number of OFDM symbols used for the ith transmission. The sending device and the receiving device may take a next symbol of the last OFDM symbol used for the (i−1)th transmission as the first OFDM symbol of the ith transmission by default according to the second location information.

In a possible implementation, for the ith transmission, when i is greater than or equal to 2, the transmission duration of the ith transmission is the same as the transmission duration of the first transmission of the at least one transmission, and the resource of the ith transmission is not adjacent to the resource of the (i−1)th transmission of the at least one transmission, the resource location indication information includes third location information corresponding to the ith transmission and the third location information includes the starting symbol location of the current transmission.

That is, during the ith transmission after the first transmission, when the time domain resource of the ith transmission is not immediately after the last transmission, but the number of OFDM symbols used is the same as the number of OFDM symbols used for the first transmission, it is not necessary to indicate the number of OFDM symbols of the ith transmission but necessary to indicate the starting symbol location of the ith transmission. The sending device and the receiving device may take the number of OFDM symbols used for the first transmission as the number of OFDM symbols of the ith transmission by default according to the third location information.

In a possible implementation, for the ith transmission, when i is greater than or equal to 2, the transmission duration of the ith transmission is the same as the transmission duration of the first transmission of the at least one transmission, and the resource of the ith transmission is adjacent to the resource of the (i−1)th transmission of the at least one transmission, the resource location indication information includes fourth location information corresponding to the ith transmission and the fourth location information is empty.

That is, during the ith transmission after the first transmission, when the time domain resource of the ith transmission is immediately after the last transmission and the number of OFDM symbols used is the same as the number of OFDM symbols used for the first transmission, it is not necessary to indicate the number of OFDM symbols and the starting symbol location of the ith transmission. The sending device and the receiving device may take the number of OFDM symbols used for the first transmission as the number of OFDM symbols of the ith transmission and take a next symbol of the last OFDM symbol used for the (i−1)th transmission as a first OFDM symbol of the ith transmission by default according to the fourth location information.

In a possible implementation, for the ith transmission, when i is greater than or equal to 2, the transmission duration of the ith transmission is different from the transmission duration of the first transmission of the at least one transmission, and the resource of the ith transmission is not adjacent to the resource of the (i−1)th transmission of the at least one transmission, the resource location indication information includes first location information corresponding to the ith transmission and the first location information is configured to indicate the starting symbol location and the transmission duration of the current transmission.

That is, during the ith transmission after the first transmission, when the time domain resource of the ith transmission is not immediately after the last transmission and the number of OFDM symbols used is different from the number of OFDM symbols used for the first transmission, it is necessary to indicate the number of OFDM symbols and the starting symbol location of the ith transmission.

At block 402, the sending device sends the acquired resource location indication information of the at least one transmission to the receiving device.

Correspondingly, the receiving device receives the resource location indication information of the at least one transmission sent by the base station.

For example, taking the sending device being a base station and the receiving device being a terminal for an example, when the terminal receives the resource location indication information of at least one transmission sent by the base station, the terminal may know the time frequency resource location where the base station may send burst data and receive the corresponding burst data at the corresponding time frequency resource location.

For example, when the base station sends the resource location indication information of at least one transmission, the base station may adopt 4-bit information for representation when the resource location indication information of the ith transmission only needs to contain the starting symbol location S of the current transmission. In a possible implementation, the base station may represent the starting symbol position S by means of encoding. For example, the starting symbol location is represented by 4-bit binary. When the starting symbol location S=9, it may be represented by 1001; when S=7, it may be represented by 0111, and so on. 14 OFDM symbol locations in one time slot may be represented one by one, which may be sent to the terminal. In another possible implementation, the base station may design 4-bit information to represent a relative transmission offset location between the ith transmission and the (i−1)th transmission, and the code method may be similar to that of the starting symbol location S, which will not be repeated here.

In a possible implementation, when the resource location indication information of the ith transmission only needs to include the symbol length L of the current transmission, similar to the symbol location, the base station may adopt 4-bit information for representation, also the symbol length L may be represented by a code method. For example, when the symbol length L=2, it may be represented by 0010, and when the symbol length L=5, it may be represented by 0101, and so on, any symbol length may be represented. It should be noted that, when 4-bit information adopted is not enough to represent the maximum symbol length L or the maximum starting symbol location S, the used code method may be changed or bit information may be added, which is not limited here.

At block 403, when performing the ith transmission of the at least one transmission, in response to an available transmission duration in the current time slot being less than the transmission duration of the ith transmission, the sending device sends data corresponding to the ith transmission to the receiving device within the current time slot and at least one time slot after the current time slot.

The available transmission duration is a duration for data transmission after the starting transmission location of the ith transmission in the current time slot.

Figure 7:
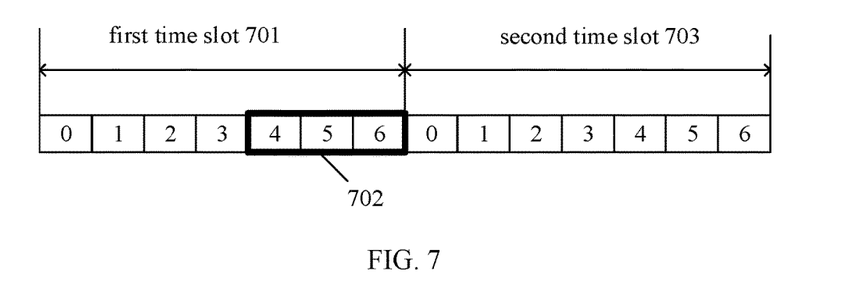
FIG. 7 is a schematic diagram illustrating a data transmission according to an embodiment of the present disclosure.

Alternatively, when the base station calculates that the transmission duration of the ith transmission is greater than the available transmission duration in the current time slot, the base station still starts to transmit burst data from the corresponding starting symbol location S within the current time slot. FIG. 7 is a schematic diagram illustrating a data transmission according to an embodiment of the present disclosure. As illustrated in FIG. 7, it includes a first time slot 701, a first symbol area 702 and a second time slot 703. The second time slot 703 is one time slot immediately after the first time slot 701, and the available transmission duration in the first time slot 701 is a time domain resource consisting of the first symbol area 702. When the starting symbol location of the ith transmission in the current time slot calculated by the base station is "4", the duration required for the transmission is 5 OFDM symbol lengths, in this case, there are not so many OFDM symbol resources in the current time slot 701 for the data transmission, the base station may select the remaining number of OFDM symbols for supplementation for the data transmission from at least one time slot (such as the second time slot 702) after the current time slot.

At block 404, when performing the ith transmission, in response to the available transmission duration in the current time slot being less than the transmission duration of the ith transmission, the receiving device receives data corresponding to the ith transmission sent by the sending device within the current time slot and at least one time slot after the current time slot.

Figure 8:
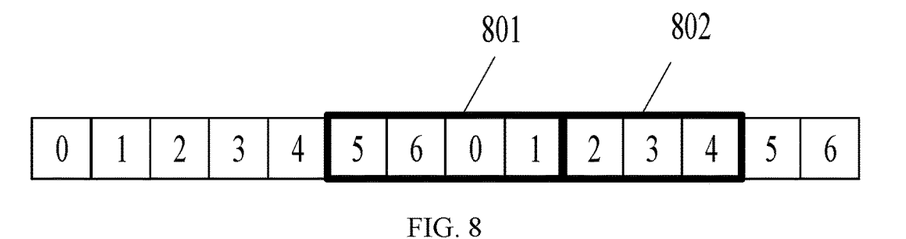
FIG. 8 is a schematic diagram illustrating a data transmission according to an embodiment of the present disclosure.

In a possible implementation, for the ith transmission, when i is greater than or equal to 2, the transmission duration of the ith transmission is different from the transmission duration of the first transmission of the at least one transmission, and the resource of the ith transmission is adjacent to the resource of the (i–1)th transmission of the at least one transmission, reference can be made to FIG. 8 which illustrates a schematic diagram of a data transmission according to an embodiment of the present disclosure. As illustrated in FIG. 8, it includes a first resource 801 and a second resource 802. The first resource 801 includes continuous OFDM symbols of the second transmission, and the second resource 802 includes continuous OFDM symbols of the third transmission. When the terminal parses the resource location indication information for the third transmission and finds that the resource location indication information includes third location information which includes the number of OFDM symbols used for the current transmission, after receiving the burst data in the second transmission, the terminal automatically continues receiving the burst data sent by the base station in the third transmission according to the number of OFDM symbols of the third transmission.

Figure 9:
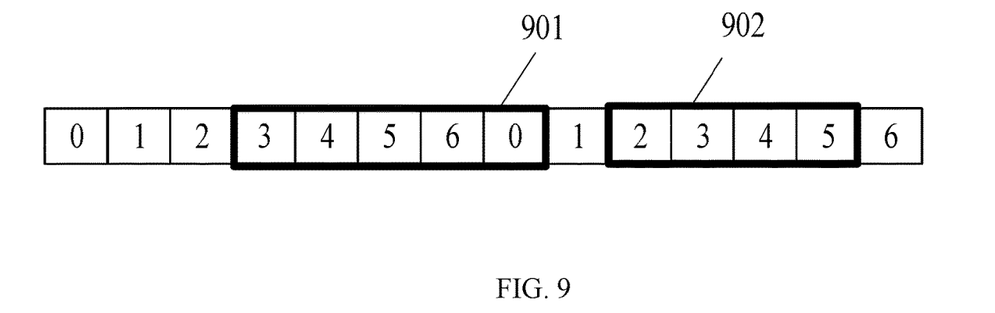
FIG. 9 is a schematic diagram illustrating a data transmission according to an embodiment of the present disclosure.

In a possible implementation, for the ith transmission, when i is greater than or equal to 2, the transmission duration of the ith transmission is the same as the transmission duration of the first transmission of the at least one transmission, and the resource of the ith transmission is not adjacent to the resource of the (i–1)th transmission of the at least one transmission, reference can be made to FIG. 9 which illustrates a schematic diagram of a data transmission according to an embodiment of the present disclosure. As illustrated in FIG. 9, it includes a first resource 901 and a second resource 902. The first resource 901 includes continuous OFDM symbols of the second transmission, and the second resource 902 includes continuous OFDM symbols of the third transmission. When the terminal derives that the resource location indication information for the third transmission includes fourth location information which includes the starting symbol location of the third transmission by parsing the resource location indication information, after receiving the burst data in the second transmission, the terminal automatically receives burst data sent by the base station in the third transmission according to the starting symbol location of the third transmission and the number of OFDM symbols of the first transmission.

Figure 10:
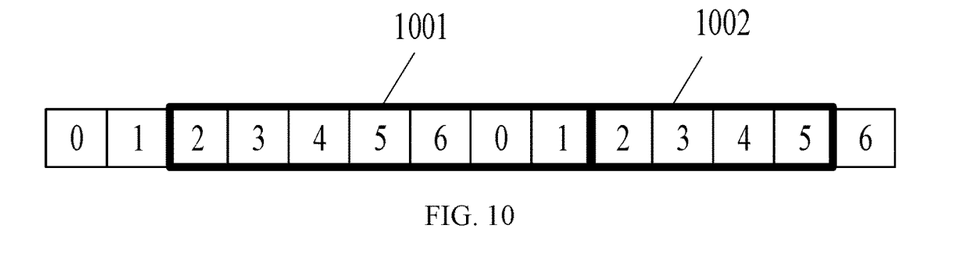
FIG. 10 is a schematic diagram illustrating a data transmission according to an embodiment of the present disclosure.

In a possible implementation, for the ith transmission, when i is greater than or equal to 2, the transmission duration of the ith transmission is the same as the transmission duration of the first transmission of the at least one transmission, and the resource of the ith transmission is adjacent to the resource of the (i–1)th transmission of the at least one transmission, reference can be made to FIG. 10 which illustrates a schematic diagram of a data transmission according to an embodiment of the present disclosure. As illustrated in FIG. 10, it includes a first resource 1001 and a second resource 1002. The first resource 1001 includes continuous OFDM symbols of the second transmission, and the second resource 1002 includes continuous OFDM symbols of the third transmission. When the terminal derives that the resource location indication information for the third transmission includes fourth location information which is empty by parsing the resource location indication information, after receiving the burst data in the second transmission, the terminal automatically continues receiving burst data sent by the base station in the third transmission according to the number of OFDM symbols of the burst data of the first transmission.

In summary, according to the disclosure, data transmission is performed with the receiving device within the available transmission duration in the current time slot of the ith transmission data and at least one time slot after the current time slot. A transmission delay problem caused by the sending device performing transmission within the next time slot when the available transmission duration in the current time slot is less than the transmission duration of the ith transmission is avoided, a waiting delay of date transmission is reduced and data transmission efficiency is improved.

It should be noted that, the sending device and the receiving device may be different terminals in the implementation environment in FIG. 1, for example, during normal communication between a first terminal and a second terminal, when the first terminal needs to transmit burst data to the second terminal, the first terminal may complete transmission of the burst data to the second terminal (the receiving device) according to the above blocks, similar to the sending device in the embodiment.

Figure 11:
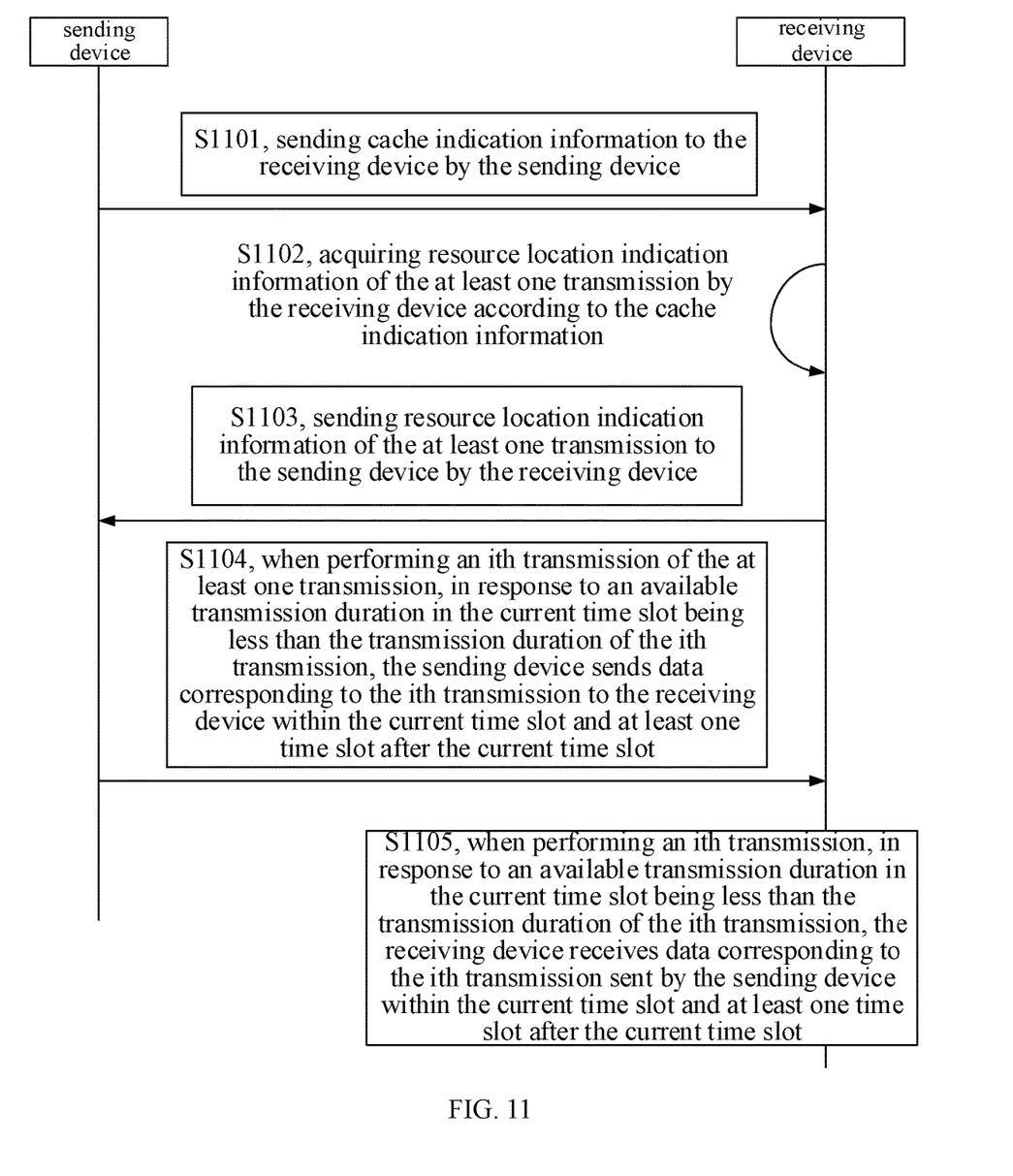
FIG. 11 is a flowchart illustrating a method for data transmission according to an embodiment of the present disclosure.

In a possible implementation, in the wireless communications system as illustrated in FIG. 1, take the sending device being a terminal and the receiving device being a base station for an example. In the burst scheduling between the base station and the terminal, the terminal initiatively sends burst data to the base station. In the process of receiving the burst data sent by the terminal by the base station the embodiments of the present disclosure provide a method for data transmission. FIG. 11 illustrates a flowchart of sending a method for data transmission provided in embodiments of the disclosure. As illustrated in FIG. 11, the method for data transmission may include the following.

At block 1101, the sending device sends cache indication information to the receiving device.

The cache indication information is configured to indicate a cache size of data to be transmitted.

Correspondingly, the receiving device receives the cache indication information sent by the sending device. The data to be transmitted may be data cached in the sending device and sent to the receiving device.

In a possible implementation, before the block, the sending device may send a burst transmission notification to the receiving device. The burst transmission notification is configured to notify the receiving device that a burst transmission is to be performed with the receiving device. The burst transmission notification may include the above cache indication information.

At block 1102, the receiving device acquires resource location indication information of at least one transmission according to the cache indication information.

The resource location indication information is configured to indicate a starting transmission location and a transmission duration of each of the at least one transmission.

After receiving the cache indication information sent by the sending device, the receiving device determines a size of a transmission block according to the cache size of data to be transmitted indicated by the cache indication information and the time delay, and generates the resource location indication information of the at least one transmission according to the available time frequency resource between the sending device and the receiving device. The resource location indication information of the at least one transmission is configured to indicate the starting transmission location and the transmission duration of each of the at least one transmission. Alternatively, regarding to the execution process of acquiring the resource location indication information of the at least one transmission by the receiving device, reference may be made to description of block 401, which is not repeated here.

At block 1103, the receiving device sends the resource location indication information of the at least one transmission to the sending device.

Correspondingly, the sending device receives the resource location indication information of the at least one transmission sent by the receiving device.

When the sending device receives the resource location indication information of the at least one transmission sent by the receiving device, the sending device may derive that the time frequency resource location where itself may send burst data and which is allocated by the receiving device, so that the sending device sends the burst data at the corresponding time frequency resource location. Alternatively, regarding to the way of sending the acquired resource location indication information of the at least one transmission by the receiving device, reference may be made to description of block 402, which is not repeated here.

That is, in embodiments of the disclosure, the resource used by the sending device to send data to the receiving device is scheduled and managed by the receiving device. For example, taking the sending device being a terminal and the receiving device being a base station for an example, the time frequency resource used by the terminal to send data to the base station is scheduled and managed by the base station, that is, the base station may inform the terminal of the available time frequency resource location in the way of sending the resource location indication information to the terminal. The terminal may send data on the time frequency resource indicated by the base station, correspondingly, the base station may receive the data sent by the terminal at the corresponding time frequency resource location.

At block 1104, when performing an ith transmission of the at least one transmission, in response to an available transmission duration in the current time slot being less than the transmission duration of the ith transmission, the sending device sends data corresponding to the ith transmission to the receiving device within the current time slot and at least one time slot after the current time slot.

The available transmission duration is a duration for data transmission after the starting transmission location of the ith transmission in the current time slot.

Alternatively, when the sending device performs the ith transmission of the at least one transmission, the execution method of sending data corresponding to the ith transmission to the receiving device is similar to the execution steps of the sending device at block 403, which is not repeated here.

At block 1105, when performing the ith transmission, in response to the available transmission duration in the current time slot being less than the transmission duration of the ith transmission, the receiving device receives data corresponding to the ith transmission sent by the sending device within the current time slot and at least one time slot after the current time slot.

Similarly, when the receiving device performs the ith transmission of the at least one transmission, the execution method of receiving data corresponding to the ith transmission sent by the sending device is similar to the execution steps of the receiving device at block 404, which is not repeated here.

In summary, in the present disclosure, data transmission is performed with the receiving device within the available transmission duration in the current time slot of the ith transmission data and at least one time slot after the current time slot. A transmission delay problem caused by the sending device performing transmission within the next time slot when the available transmission duration in the current time slot is less than the transmission duration of the ith transmission is avoided, a waiting delay of date transmission is reduced and data transmission efficiency is improved.

Apparatus embodiments of the present disclosure described below may be configured to implement the method embodiments of the present disclosure. For details not disclosed in the apparatus embodiments of the present disclosure, reference can be made to the method embodiments of the present disclosure.

Figure 12:
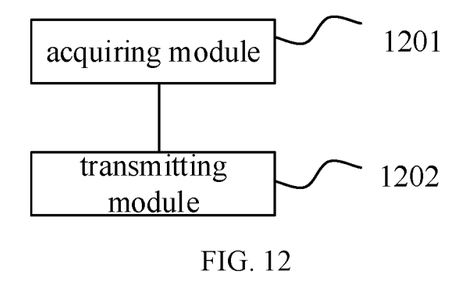
FIG. 12 is a block diagram illustrating an apparatus for data transmission according to an embodiment.

FIG. 12 is a block diagram illustrating an apparatus for data transmission according to an example embodiment. As illustrated in FIG. 12, the apparatus for data transmission may be implemented as all or a part of a first device through hardware or a combination of hardware and software to execute the blocks executed by the first device in the embodiment of FIG. 3, or execute the blocks executed by a sending/receiving device in the embodiments of FIG. 4 or FIG. 11. The apparatus for data transmission may include an acquiring module 1201 and a transmitting module 1202.

The acquiring module 1201 is configured to acquire resource location indication information of at least one transmission. The resource location indication information is configured to indicate a starting transmission location and a transmission duration of each of the at least one transmission.

The transmitting module 1202 is configured to, when performing an ith transmission of the at least one transmission, perform the ith transmission with a second device within a current time slot and at least one time slot after the current time slot in response to an available transmission duration in the current time slot being less than the transmission duration of the ith transmission. The second device is the other device of the two devices.

The available transmission duration is a duration for data transmission after the starting transmission location of the ith transmission in the current time slot.

Alternatively, for a first transmission of the at least one transmission, the resource location indication information includes first location information corresponding to the first transmission. The first location information is configured to indicate a starting transmission location and a transmission duration of a current transmission.

Alternatively, the first location information of the first transmission includes a starting symbol location of the first transmission and a number of OFDM symbols used for the first transmission. The starting symbol location is a location of a first OFDM symbol of the current transmission in the corresponding time slot.

Alternatively, the first location information of the first transmission includes an SLIV of the first transmission.

Alternatively, when the SLIV of the first transmission is a preset value, the first location information of the first transmission further includes start location indication information. The start location indication information is configured to indicate whether a corresponding starting symbol location is greater than a preset symbol location.

Alternatively, for the ith transmission, when i is greater than or equal to 2, the transmission duration of the ith transmission is different from the transmission duration of the first transmission of the at least one transmission, and a resource of the ith transmission is not adjacent to a resource of the (i−1)th transmission of the at least one transmission, the resource location indication information includes first location information corresponding to the ith transmission. The first location information is configured to indicate a starting transmission location and a transmission duration of a current transmission.

Alternatively, for the ith transmission, when i is greater than or equal to 2, the transmission duration of the ith transmission is different from the transmission duration of the first transmission of the at least one transmission, and a resource of the ith transmission is adjacent to a resource of the (i−1)th transmission of the at least one transmission, the resource location indication information includes second location information corresponding to the ith transmission. The second location information includes the number of OFDM symbols used for the current transmission.

Alternatively, for the ith transmission, when i is greater than or equal to 2, the transmission duration of the ith transmission is the same as the transmission duration of the first transmission of the at least one transmission, and a resource of the ith transmission is not adjacent to a resource of the (i−1)th transmission of the at least one transmission, the resource location indication information includes third location information corresponding to the ith transmission. The third location information includes a starting symbol location of a current transmission.

Alternatively, for the ith transmission, when i is greater than or equal to 2, the transmission duration of the ith transmission is the same as the transmission duration of the first transmission of the at least one transmission, and a resource of the ith transmission is adjacent to a resource of the (i−1)th transmission of the at least one transmission, the resource location indication information includes fourth location information corresponding to the ith transmission. The fourth location information is empty.

It should be noted that, the division of functional modules for implementing the functionalities in the apparatus provided in the above embodiments is only for illustration. In practical applications, the above functionalities may be completed by different functional modules according to actual requirements, that is, the device can be divided into different functional modules to complete all or part of functionalities described above.

Regarding the apparatus in the above embodiments, the specific manner in which each module performs operation has been described in detail in the method embodiments, and detailed description are not given here.

In an example embodiment of the disclosure, an apparatus for data transmission is provided, to implement all or part of blocks executed by a first device of two devices for data transmission in the embodiments as illustrated in FIG. 3, FIG. 4 or FIG. 11. The apparatus for data transmission includes: a processor; a memory configured to store instructions executable by the processor. The processor is configured to: acquire resource location indication information of at least one transmission, the resource location indication information being configured to indicate a starting transmission location and a transmission duration of each of the at least one transmission; when performing an ith transmission of the at least one transmission, perform the ith transmission with a second device within a current time slot and at least one time slot after the current time slot in response to an available transmission duration in the current time slot being less than the transmission duration of the ith transmission; the second device being the other device of the two devices; in which, the available transmission duration is a duration for data transmission after the starting transmission location of the ith transmission in the current time slot.

Alternatively, for a first transmission of the at least one transmission, the resource location indication information includes first location information corresponding to the first transmission, the first location information being configured to indicate a starting transmission location and a transmission duration of a current transmission.

Alternatively, the first location information of the first transmission includes a starting symbol location of the first transmission and a number of OFDM symbols used for the first transmission; the starting symbol location being a location of a first OFDM symbol of the current transmission in a corresponding time slot.

Alternatively, the first location information of the first transmission includes an SLIV of the first transmission.

Alternatively, when the SLIV of the first transmission is a preset value, the first location information of the first transmission further includes start location indication information, the start location indication information being configured to indicate whether a corresponding starting symbol location is greater than a preset symbol location.

Alternatively, for the ith transmission, when i is greater than or equal to 2, the transmission duration of the ith transmission is different from the transmission duration of the first transmission of the at least one transmission, and a resource of the ith transmission is not adjacent to a resource of the (i−1)th transmission of the at least one transmission, the resource location indication information includes first location information corresponding to the ith transmission, the first location information being configured to indicate a starting transmission location and a transmission duration of a current transmission.

Alternatively, for the ith transmission, when i is greater than or equal to 2, the transmission duration of the ith transmission is different from the transmission duration of the first transmission of the at least one transmission, and a resource of the ith transmission is adjacent to a resource of the (i−1)th transmission of the at least one transmission, the resource location indication information includes second location information corresponding to the ith transmission, the second location information including a number of OFDM symbols used for a current transmission.

Alternatively, for the ith transmission, when i is greater than or equal to 2, the transmission duration of the ith transmission is the same as the transmission duration of the first transmission of the at least one transmission, and a resource of the ith transmission is not adjacent to a resource of the (i−1)th transmission of the at least one transmission, the resource location indication information includes third location information corresponding to the ith transmission, the third location information including a starting symbol location of a current transmission.

Alternatively, for the ith transmission, when i is greater than or equal to 2, the transmission duration of the ith transmission is the same as the transmission duration of the first transmission of the at least one transmission, and a resource of the ith transmission is adjacent to a resource of the (i−1)th transmission of the at least one transmission, the resource location indication information includes fourth location information corresponding to the ith transmission, the fourth location information being empty.

The technical solution provided in embodiments of the present disclosure is introduced mainly by taking a receiving device and a sending device for an example. It could be understood that, the receiving device and the sending device include hardware structures and/or software modules that execute various functions in order to implement the above functions. In combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 13:
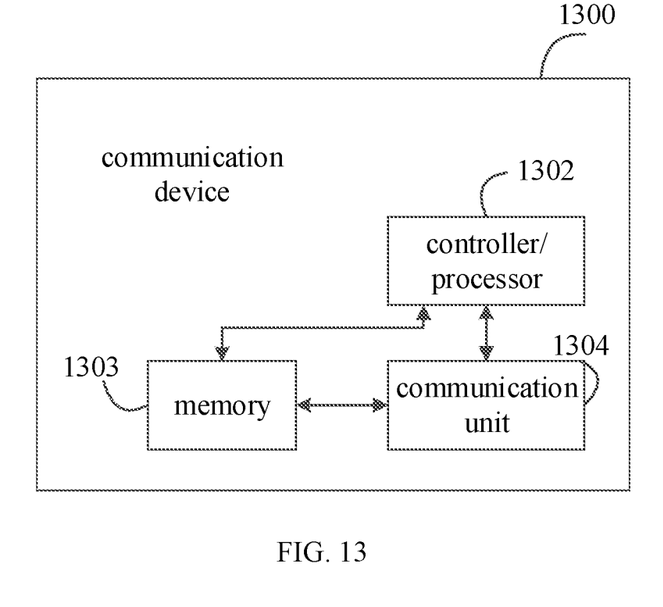
FIG. 13 is a block diagram illustrating a communication device according to an embodiment.

FIG. 13 is a block diagram illustrating a communication device according to an example embodiment. The communication device may be implemented as a first device of two devices for data transmission described in the embodiments with reference to the FIG. 3. Or, the communication device may be implemented as a sending device or a receiving device described in the embodiments with reference to FIG. 4 and FIG. 11.

The communication device 1300 includes a communication unit 1304 and a processor 1302. The processor 1302 also may be a controller, represented as a "controller/processor 1302" in FIG. 13. The communication unit 1304 is configured to support communication between the IOV device and other network entities (for example, other IOV devices, etc.) Further, the communication device 1300 further includes a memory 1303 configured to store program codes and data of the IOV device 1300.

It should be understood that, FIG. 13 only illustrates a simplified design of the communication device 1300. In practical applications, the communication device 1300 may include any number of processors, controllers, memories, communication units, etc., and all access network devices that may be implemented in embodiments of the present disclosure are within the protection scope of embodiments of the present disclosure.

Those skilled may realize that in one or more examples, the functions described in embodiments of the disclosure may be implemented with a hardware, a software, a firmware and their combination. The functions may be stored in a computer readable storage medium or transmitted as one or more instructions or codes on a computer readable medium when implemented with a software. Computer-readable media include a computer storage medium and a communication medium, in which the communication medium includes any medium that facilitates transmission of a computer program from one place to another. A storage medium may be any available medium that may be accessed by a general purpose or special purpose computer.

Embodiments of the disclosure further provide a computer storage medium configured to store computer software instructions for use in the above communication device, the instructions including a program designed to perform a method for data transmission among the communication devices.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims.

What is claimed is:

1. A method for data transmission, performed by a first device of two devices for data transmission, comprising:
   acquiring resource location indication information of at least one transmission, wherein the resource location indication information is configured to indicate a starting transmission location and a transmission duration of each of the at least one transmission;
   when performing an ith transmission of the at least one transmission, performing the ith transmission with a second device within a current time slot and at least one time slot after the current time slot in response to an available transmission duration in the current time slot being less than the transmission duration of the ith transmission, wherein the second device is the other device of the two devices;
   wherein, the available transmission duration is a duration for data transmission after the starting transmission location of the ith transmission in the current time slot;
   wherein, for a first transmission of the at least one transmission, the resource location indication information comprises first location information corresponding to the first transmission, and the first location information is configured to indicate a starting transmission location and a transmission duration of a current transmission.

2. The method of claim 1, wherein, the first location information of the first transmission comprises a starting symbol location of the first transmission and a number of OFDM symbols used for the first transmission; wherein the starting symbol location is a location of a first OFDM symbol of the current transmission in a corresponding time slot.

3. The method of claim 1, wherein, the first location information of the first transmission comprises an SLIV of the first transmission.

4. The method of claim 3, wherein, when the SLIV of the first transmission is a preset value, the first location information of the first transmission further comprises start location indication information, wherein the start location indication information is configured to indicate whether a corresponding starting symbol location is greater than a preset symbol location.

5. The method of claim 1, wherein, for the ith transmission, when i is greater than or equal to 2, the transmission duration of the ith transmission is different from the transmission duration of the first transmission of the at least one transmission, and a resource of the ith transmission is not adjacent to a resource of the (i-1)th transmission of the at least one transmission, the resource location indication information comprises first location information corresponding to the ith transmission, wherein the first location information is configured to indicate a starting transmission location and a transmission duration of a current transmission.

6. The method of claim 1, wherein, for the ith transmission, when i is greater than or equal to 2, the transmission duration of the ith transmission is different from the transmission duration of the first transmission of the at least one transmission, and a resource of the ith transmission is adjacent to a resource of the (i-1)th transmission of the at least one transmission, the resource location indication information comprises second location information corresponding to the ith transmission, wherein the second location information comprises a number of OFDM symbols used for a current transmission.

7. The method of claim 1, wherein, for the ith transmission, when i is greater than or equal to 2, the transmission duration of the ith transmission is the same as the transmission duration of the first transmission of the at least one transmission, and a resource of the ith transmission is not adjacent to a resource of the (i-1)th transmission of the at least one transmission, the resource location indication information comprises third location information corresponding to the ith transmission, wherein the third location information comprises a starting symbol location of a current transmission.

8. The method of claim 1, wherein, for the ith transmission, when i is greater than or equal to 2, the transmission duration of the ith transmission is the same as the transmission duration of the first transmission of the at least one transmission, and a resource of the ith transmission is adjacent to a resource of the (i-1)th transmission of the at least one transmission, the resource location indication information comprises fourth location information corresponding to the ith transmission, wherein the fourth location information is empty.

9. A device for data transmission, applicable in a first device of two devices for data transmission, comprising:
a processor;
a memory configured to store instructions executable by the processor;
wherein, the processor is configured to:
acquire resource location indication information of at least one transmission, wherein the resource location indication information is configured to indicate a starting transmission location and a transmission duration of each of the at least one transmission;
when performing an ith transmission of the at least one transmission, perform the ith transmission with a second device within a current time slot and at least one time slot after the current time slot in response to an available transmission duration in the current time slot being less than the transmission duration of the ith transmission, wherein the second device is the other device of the two devices;
wherein, the available transmission duration is a duration for data transmission after the starting transmission location of the ith transmission in the current time slot;
wherein, for a first transmission of the at least one transmission, the resource location indication information comprises first location information corresponding to the first transmission, and the first location information is configured to indicate a starting transmission location and a transmission duration of a current transmission.

10. A non-transitory computer readable storage medium comprising executable instructions, wherein when the executable instructions are called by a processor of a first device, the processor is caused to implement operations of:
acquiring resource location indication information of at least one transmission, wherein the resource location indication information is configured to indicate a starting transmission location and a transmission duration of each of the at least one transmission;
when performing an ith transmission of the at least one transmission, performing the ith transmission with a second device within a current time slot and at least one time slot after the current time slot in response to an available transmission duration in the current time slot being less than the transmission duration of the ith transmission, wherein the second device is the other device of the two devices;
wherein, the available transmission duration is a duration for data transmission after the starting transmission location of the ith transmission in the current time slot;
wherein, for a first transmission of the at least one transmission, the resource location indication information comprises first location information corresponding to the first transmission, and the first location information is configured to indicate a starting transmission location and a transmission duration of a current transmission.

11. The device of claim 9, wherein, the first location information of the first transmission comprises a starting symbol location of the first transmission and a number of OFDM symbols used for the first transmission; wherein the starting symbol location is a location of a first OFDM symbol of the current transmission in a corresponding time slot.

12. The device of claim 9, wherein, the first location information of the first transmission comprises an SLIV of the first transmission.

13. The device of claim 12, wherein, when the SLIV of the first transmission is a preset value, the first location information of the first transmission further comprises start location indication information, wherein the start location indication information is configured to indicate whether a corresponding starting symbol location is greater than a preset symbol location.

14. The device of claim 9, wherein, for the ith transmission, when i is greater than or equal to 2, the transmission duration of the ith transmission is different from the transmission duration of the first transmission of the at least one transmission, and a resource of the ith transmission is not adjacent to a resource of the (i-1)th transmission of the at least one transmission, the resource location indication information comprises first location information corresponding to the ith transmission, wherein the first location information is configured to indicate a starting transmission location and a transmission duration of a current transmission.

15. The device of claim 9, wherein, for the ith transmission, when i is greater than or equal to 2, the transmission duration of the ith transmission is different from the transmission duration of the first transmission of the at least one transmission, and a resource of the ith transmission is adjacent to a resource of the (i-1)th transmission of the at least one transmission, the resource location indication information comprises second location information corresponding to the ith transmission, wherein the second location information comprises a number of OFDM symbols used for a current transmission.

16. The device of claim 9, wherein, for the ith transmission, when i is greater than or equal to 2, the transmission duration of the ith transmission is the same as the transmission duration of the first transmission of the at least one transmission, and a resource of the ith transmission is not adjacent to a resource of the (i-1)th transmission of the at least one transmission, the resource location indication information comprises third location information corresponding to the ith transmission, wherein the third location information comprises a starting symbol location of a current transmission.

17. The device of claim 9, wherein, for the ith transmission, when i is greater than or equal to 2, the transmission duration of the ith transmission is the same as the transmission duration of the first transmission of the at least one transmission, and a resource of the ith transmission is adjacent to a resource of the (i-1)th transmission of the at least one transmission, the resource location indication information comprises fourth location information corresponding to the ith transmission, wherein the fourth location information is empty.

\* \* \* \* \*